(12) United States Patent
Kurowski et al.

(10) Patent No.: US 8,580,209 B2
(45) Date of Patent: Nov. 12, 2013

(54) MICROFLUIDIC FOIL STRUCTURE FOR METERING OF FLUIDS

(75) Inventors: Dirk Kurowski, Gevelsberg (DE); Mario Hempel, Dortmund (DE); Gert Blankenstein, Dortmund (DE); Tobias Rodenfels, Dortmund (DE)

(73) Assignee: Boehringer Ingelheim Microparts GmbH, Dortmund (DE)

( * ) Notice: Subject to any disclaimer, the term of this patent is extended or adjusted under 35 U.S.C. 154(b) by 37 days.

(21) Appl. No.: 12/995,550

(22) PCT Filed: Jun. 2, 2009

(86) PCT No.: PCT/EP2009/003908
§ 371 (c)(1),
(2), (4) Date: Dec. 30, 2010

(87) PCT Pub. No.: WO2009/156045
PCT Pub. Date: Dec. 30, 2009

(65) Prior Publication Data
US 2011/0135546 A1 Jun. 9, 2011

(30) Foreign Application Priority Data
Jun. 2, 2008 (EP) .................................... 08010082

(51) Int. Cl.
*B01L 3/00* (2006.01)
*B32B 37/00* (2006.01)
*B32B 7/02* (2006.01)

(52) U.S. Cl.
USPC ..................... 422/503; 422/502; 156/309.6

(58) Field of Classification Search
USPC ................. 422/502, 503; 137/309.6
See application file for complete search history.

(56) References Cited

U.S. PATENT DOCUMENTS

| 5,324,467 | A | * | 6/1994 | Anderson, II | ............ 264/173.15 |
| 6,293,012 | B1 | | 9/2001 | Moles | |
| 6,428,901 | B1 | * | 8/2002 | Agarwal et al. | ............... 428/516 |
| 2002/0168278 | A1 | | 11/2002 | Jeon et al. | |
| 2005/0089449 | A1 | * | 4/2005 | Polwart et al. | ................ 422/100 |
| 2006/0076068 | A1 | | 4/2006 | Young et al. | |

FOREIGN PATENT DOCUMENTS

| WO | 2007029132 A2 | 3/2007 |
| WO | WO 2008087405 | * 7/2008 |

OTHER PUBLICATIONS

International Search Report, Form PCT/ISA/210, for corresponding PCT/EP2009/003908; date of mailing Feb. 2, 2010.

\* cited by examiner

*Primary Examiner* — Jill Warden
*Assistant Examiner* — Timothy G Kingan
(74) *Attorney, Agent, or Firm* — Michael P. Morris; Mary-Ellen M. Devlin (57) ABSTRACT

A microfluidic device meters liquids into a network of channels or chambers partly formed by a film partly attached to and above a substrate, the network permitting flow of fluid above the substrate. To form a channel or chamber, the edge zone between unattached and attached portions of the film forms a wedge of material by viscous flow of film material as the film is laminated to the substrate, this wedge forming a transition between the chamber wall and the substrate, raising the wall above the plane of the substrate. Film is laminated with a mask having an opening, the mask pressed onto the film under pressure and/or with heat. The film is brought to a temperature to produce a viscous flow of film and/or substrate medium into the region of the opening, forming a wedge of material as the film bulges up at the opening to form a chamber.

11 Claims, 8 Drawing Sheets

MICROFLUIDIC FOIL STRUCTURE FOR METERING OF FLUIDS

The present invention relates to a structure for metering a liquid in a microfluidic network according to the precharacterising clause of claim 1 and a process for producing a structure of this kind and a process for metering a liquid using such a structure.

The present invention relates in particular to those microfluidic structures and devices that make use of the capillary effect or pressure differences to convey a liquid and wherein at least some of the microfluidic structures consist of chambers and/or channels which are formed by a foil above a plate-shaped substrate.

Valve structures are known from the priority art in which an elastic membrane is used for opening and/or closing a microfluidic valve.

Thus, US 2005/0205816 A1 discloses a valve for microfluidic structures, in particular for controlling the flow in a microfluidic channel, wherein the flow can be interrupted by a flexible membrane that is arranged over part of the flow channel. For this purpose, compressed air is applied to a chamber adjoining the membrane and the membrane is thus deflected such that it is moved into the path of the channel and closes it off.

U.S. Pat. No. 5,811,291 describes a microfluidic device which is produced by the lamination of two polymer foils, particularly PE foils, against one another. The foils are joined together in parts by the effect of pressure and heat so that chambers and channels can form in unconnected laminating regions by the introduction of liquid. U.S. Pat. No. 5,811,291 relates in particular to a cuvette.

US 2006/0076068 A1 discloses a microfluidic pump and a microfluidic valve and a process for producing them, wherein the valve is formed by a membrane that covers channel structures in a carrier material. The valve is produced using selective lamination, while the membrane remains unattached in the region of the valve.

US 2006/0057030 A1 discloses a microfluidic device, a so-called MEMS device for transporting liquids from a reservoir, in which the liquid reservoir is formed in a base plate. The base plate with the reservoir and with a channel as the liquid-conveying structures is covered by a first polymer film. The first polymer film has openings to the reservoir and to the channel.

Another, second polymer film is arranged over the first polymer film, the second film being partially domed, so that chambers are formed by the convexity. These chambers are fluidically separated from one another and filled with air, while the application of sufficient pressure, e.g. by pressing the chambers together, causes separation points to break open between the first and second films and the compressed air escaping through the openings to displace the liquid from the reservoir into the channel.

U.S. Pat. No. 6,902,706 B1 discloses a valve for controlling a liquid in an analysis chip. The valve comprises a foil that covers channel ends in a substrate. The foil is convex in a dome shape in the region of the channel ends and connects these ends by means of this dome-shaped chamber. The dome can be lowered by means of a pneumatic conical actuator, thereby closing the valve.

US 2005/0037471 A1 describes a method of producing a microfluidic valve or a microfluidic pump in which a first channel is formed in a flat elastomeric plastic sheet. A second tool is used to form a second channel in a second layer of elastomer. The first sheet is placed with the channel side on the flat, planar surface of the second layer and attached thereto. The lower plate is then placed, with the second channels still open, on a flat planar carrier substrate such as a sheet of glass, for example. A liquid carried through the first channel can deflect the membrane formed by the elastomeric separating material at the point of intersection between the first and second channels and thus acts as a valve.

US 2005/02058816 A1 discloses a microfluidic membrane valve. A flexible membrane is used which is arranged above a flow channel. By introducing a pneumatic pressure or a vacuum into a chamber adjoining the membrane, the membrane is deflected and closes off or opens up the flow channel.

To obtain valve structures or metering elements according to the disclosures described above the general procedure is to form channel structures by deforming an elastomer foil or an elastomeric plastics sheet.

The disadvantage is that the contours that are to be formed therefore have to be created with high precision in a moulding die. The production of three-dimensionally microstructured dies of this kind is cost-intensive.

In addition, mechanical machining techniques for producing such dies can at present only be used down to a certain minimum size of structure. Structures with dimensions significantly below one micron require phototechnical methods to create the die, which drives up the costs of the die still further.

It is therefore an aim of the invention to provide a production process and microfluidic structures according to this production process that can be produced economically.

A further aim of the invention is to provide an alternative method of producing microfluidic structures with sizes of structure in the nanometre range or one-digit micron range, and to produce such structures with improved fluid-conveying properties.

According to the prior art, a valve is generally formed by an element wherein an elastic membrane rests on fluid-conveying structures in a carrier substrate and in the relaxed state closes off these fluid channels.

By applying internal pressure to the liquid or externally applied pressure to the valve member, the membrane is deflected and opens up the fluid path.

It is also known to form fluid-conveying structures in an elastic sheet material and place the fluid network thus obtained on a flat substrate. In order to actuate and control such channels in a targeted manner one or more channel systems are layered one above the other and expanded pneumatically or hydraulically, for example, whereby opening or closing channels in another plane. Usually, laborious and expensive structuring techniques are needed to provide fluid networks of this kind.

Against this background the objective is to provide a simple method of producing such structures that does not require any pre-structuring of substrates, foils or membranes and enables a fluid valve to be produced in a single working step.

A further aim of the invention is to simplify the actuation of microfluidic control members such as valves in order to produce a passive microfluidic control element with improved properties for conveying liquids.

The above aims are achieved by means of a microfluidic structure element according to claim 1, a method of producing a microfluidic structure of this kind according to claim 31 and a method of metering a liquid according to claim 37 with a microfluidic structure of this kind.

It is envisaged according to the invention that a flat foil or film should be applied to a flat substrate or carrier, more particularly sealed to this carrier.

The sealing, particularly lamination, is carried out by placing the carrier and the film one above the other. Then for the lamination a mask (heated die) is placed on the film. The mask has a recess or opening; in the region of the recess or opening, there is no contact between the mask (die) and the film.

As a result of the action of heat and the contact pressure of the die, the material of the film and/or substrate begins to flow and the material moves into the recesses and/or openings.

As a result, in the inner edge region of the recess or opening, material is accumulated in the form of a wedge between the substrate and film By the term wedge in the sense of the invention is meant an accumulation or heaping up of film and/or substrate material in the edge region of an unsecured piece of film between the film and the substrate. The shape may be different from the literal meaning of a wedge, with the result that the wedge of material may take the form of a bead, a triangle, a segment of a circle, an elliptical shape and combinations and sections of these shapes.

If a multi-layer film is used, this advantageously has a low-melting plastics material as the sealing layer inside the substrate and an external higher-melting material in the form of a cover layer/cover film. A sealing film material may be for example ethylene vinyl acetate (EVA) or ethylene acrylic acid (EAA) and a material for the cover film is typically polypropylene (PP), or polystyrene, polycarbonate, polyethylene or acrylates.

Advantageously the EVA melts homogeneously during lamination. This material that has low viscosity during melting is pressed into the spaces in the mask under the film, forms a bead or a wedge and causes the film to bulge in the opening and/or stabilises the bulge in the film in the region of the opening.

The wedge of material raises the film from the plane of the substrate in the edge zone between the secured portions and in the unsecured portion.

Advantageously a plastics material which has a melting temperature of 60° C. to 190° C., particularly 85° C. to 130° C., is used for the sealing layer.

The melting temperature of the covering layer or cover film used in conjunction with the sealing layer should be distinct from this and should be above this.

Cover film materials should therefore reach a melting temperature of 150° C. to 400° C., particularly 200° C. to 300° C.

In order to achieve bonding or cross-linking of the plastics, total melting must take place. Alternatively it may also be sufficient if the sealing layer softens at 60° C. to 190° C., more particularly 85° C. to 130° C. and cross-links the softened material. It is also possible for cross-linking or bonding of the cover film to take place as the result of softening of the material under the temperature regime described above.

Depending on the viscosity of the plastics used it is also possible for lamination to take place without melting or tackifying of the materials. The film is heated only until the film material softens, which then flows in viscous manner.

Alternatively it would also be possible to carry out the lamination by the use of a solvent. The solvent is applied to the areas of the substrate that are to be attached. For selective application, the solvent may be sprayed or painted or stamped on through a mask, for example.

Then the film to be laminated is placed on top and pressed on by means of another mask or die. This attachment may also be carried out at ambient temperature without any application of heat. In this embodiment, preferably pre-shaped films are laminated on. The material which has started to dissolve thanks to the solvent is pressed into the pre-formed chamber regions in the film and forms a wedge of material.

By the term "chamber" is meant, in the present invention, any fluid-conveying structure that is three-dimensionally shaped, such as an elongate channel, lines leading to a valve or a pouch. The fluids used may be liquids and gases.

Advantageously, a smooth flat substrate is used as the base of the microfluidic device. The base or the substrate may also be formed by a film. The microfluidic structure is then formed only by chambers, particularly inlet chambers, sample chambers, ratio chambers and channels, which are formed as three-dimensional structures in the film and are raised above the unstructured substrate plane.

The chambers and channels form a complete microfluidic network above the substrate surface.

Advantageously, fluid-conveying structures within the substrate may also be covered by the chambers in the film, such as in particular channel sections or openings in the substrate. An opening in the substrate may connect fluidic networks on the top and bottom of the substrate or form an inlet region with an opening in the substrate through which sample fluid can be introduced into the microfluidic network.

The mouth of an opening or the end of a channel in the substrate terminates at the substrate surface and, as the opening or channel extends into the substrate, forms a step to the chamber in the film located above the plane of the substrate.

In a microfluidic device operated by capillary means a step of this kind may form a capillary stop.

According to the invention this capillary stop may be overcome either passively or actively. For this, the chamber wall or chamber base must be wetted, from the step in the substrate.

The chamber or channel structure in the film is raised above the plane of the substrate in the manner of a cupola, more particularly a dome.

The edge region between the chamber wall and the chamber base forms an angle of 2° to 90°, advantageously in particular an angle of 5° to 25°. With small aperture angles, a low gap is formed at the edge of the chamber. This low gap height generates high capillary forces in the region of the base of the chamber.

In order to achieve passive overcoming of the capillary stop, the outer edge of the chamber is arranged above the step edge of a transverse bore or a channel end such that a capillary gap of 1 micron to 50 microns, more particularly from 10 microns to 50 microns, is left between the step edge and the chamber wall that covers the step edge. During operation, this capillary gap can be overcome by the liquid front accumulating and bulging at the step.

In another embodiment, not shown, a capillary stop is formed by a hydrophobic region. A capillary stop of this kind may be produced for example by the use of a hydrophobic plastics or by coating. This capillary stop can also be overcome by the wetting of adjoining film walls.

In one embodiment of the invention, a membrane is arranged between the film and the substrate. A membrane of this kind may be provided for example in order to carry out the filtering or separation of particles in a sample liquid supplied. Advantageously, the membrane is arranged for example over or in a throughflow opening in the substrate or in a supply chamber for sample liquid that is open to the atmosphere.

The membrane may in particular be arranged in the gap between the film and substrate, so that the membrane can bridge a capillary stop and serve as a wetting aid.

A capillary stop can be overcome actively by pressing the film down over the edge of the step so that the capillary gap is reduced to the point where wetting of the chamber starts from the fluid-conveying structure in the substrate.

Advantageously, a structure of this kind may act as a valve. A throughflow opening through the substrate is covered by a chamber. The capillary stop formed by the throughflow opening holds back the flow of fluid at the opening.

If the film is then pressed down in the region of the chamber, i.e. the chamber wall above the throughflow opening, the fluid current can be carried onwards by the wetting that is taking place. The elastic chamber wall thus acts as a reversible elastic open valve in the microfluidic network. Thanks to its resilient dimensional stability, the film material returns to its original position, so that once a first metered amount of fluid has flowed out, further quantities of fluid can be metered.

In one embodiment of the invention, films are laminated onto both the top and bottom of the substrate and cover microfluidic structures there or form microfluidic chambers.

Instead of a die or punch or other electromechanical tools that deform the film for wetting by pressing down the chamber walls, it is also possible to meter fluids by the introduction of compressed air or by bending the substrate.

For this purpose, an elastic substrate is clamped on one or both sides at contact points or guides on the substrate carrier and then mechanically bent. When there is a positive bend and/or curvature in the substrate, the surface is stretched by comparison with the deformation-neutral core fibre of the substrate, with the result that the film is also stretched.

This ensures that the chamber wall is moved in relation to a capillary step, thus causing wetting. Where the bends are greater, a channel or a chamber may be totally closed off.

In an assisting capacity, it is also possible for the substrate to have a recess, particularly in the form of a wedge or a cut-out, on the side of the substrate remote from the film. When the substrate is bent, high bending radii are obtained in these areas, thus producing particularly high degrees of adjustment travel for the chamber walls.

Advantageously a support member, particularly an anvil, is provided on which the substrate is supported during bending or which acts as a movable die and thus introduces the bend into the substrate carrier During bending, the cross-sectional area of a channel or a chamber is made smaller or larger, depending on the mathematical sign of the bending. The flow in the channel or chamber can be deliberately constricted in this way.

The opening and closing of a channel or chamber may be carried out periodically and in directionally oriented manner, as a result of which the channel or the chamber in the film is operated as a pump. Thus, for example, in the case of a film chamber that covers two channels ends, it is conceivable initially to close off one channel end by pressing the film down in the form of the chamber wall, by means of a die, then to move the die towards the second channel end which is still open and force the quantity of liquid enclosed in the open chamber region into the second channel.

Alternatively to this pump mechanism, the principle of the peristaltic pump may also be used, in which drums are moved in one direction over a film channel. In a linear embodiment of the pump, a series of actuators arranged one behind the other are actuated in a wave movement and in this way liquid is conveyed forwards in the tubular elastic film channel.

Advantageously, the substrate may also be excited by flexural vibrations, for example with harmonic inherent resonances of the substrate or the fluid-filled elastic film system, so that transverse waves, particularly vertical waves moving along are impressed into the liquid columns and thus drive the liquid along or help to overcome a capillary stop.

Thanks to the present invention it is possible in particular to produce very small-capacity chambers with volumes of 0.01 microlitres, 0.1 microlitres, 0.2 microlitres, 0.5 microlitres, 1 microlitre, 3 microlitres, 5 microlitres, 10 microlitres and 20 microlitres and other volumes, particularly also intermediate sizes that are obtained from combinations of the volumes stated above.

The chambers formed in the film are preferably discus-shaped in cross-section, the width of the chambers in cross-section being at least 20 times the height of the chamber.

In one embodiment, the cross-sectional height is 10 to 15 microns in the apex region of the cross-section, 5 to 10 microns in a central cross-sectional area between the edge and the vertex or apex region and 0.1 to 5 microns in the edge region.

If a sample liquid in which particles of different sizes are transported, for example thrombocytes 1 to 4 microns in size and erythrocytes 7 to 8 microns in size, flow through a channel with such a cross-section, the leukocytes accumulate in the apex region of the cross section, the erythrocytes in a central region and the thrombocytes in the edge region of the cross-section.

In this way it is possible to separate blood components, particularly when the currents are separated, i.e. for example when the cross-section branches accordingly or merges into channels or throughflow openings with an associated cross-sectional diameter.

In one embodiment it is envisaged that the apex or dome of the chamber be lowered. This ensures that there is a high capillarity operating in the microfluidic structure both in the outer gap regions of the film chamber and also in the centre of the chamber.

Certain plastics materials may have the ability to alter and then resume their shape under the effect of heat.

In order to make use of this property of shape memory, a film material of polyethylene or polyamide is heated to a temperature above a so-called activation temperature and the desired shape is given to the film at this temperature. In particular, at this temperature, chambers and/or channels are introduced into the film, particularly by shaping these chambers according to the invention, or in particular by thermoforming the heated film. Then the film is rapidly cooled so that the film retains its deformed shape.

Subsequent heating of the film to above the activation temperature causes it to return to its original shape.

By local heating of a channel from a shape memory plastics material treated in this way, the channel can be closed or opened along the heated sections.

A closure valve by means of which a chamber is closed via a throughflow opening or channel sections can also be produced in this way.

Further features of the invention can be inferred from the following embodiments by way of example and the drawings.

Figure 1:
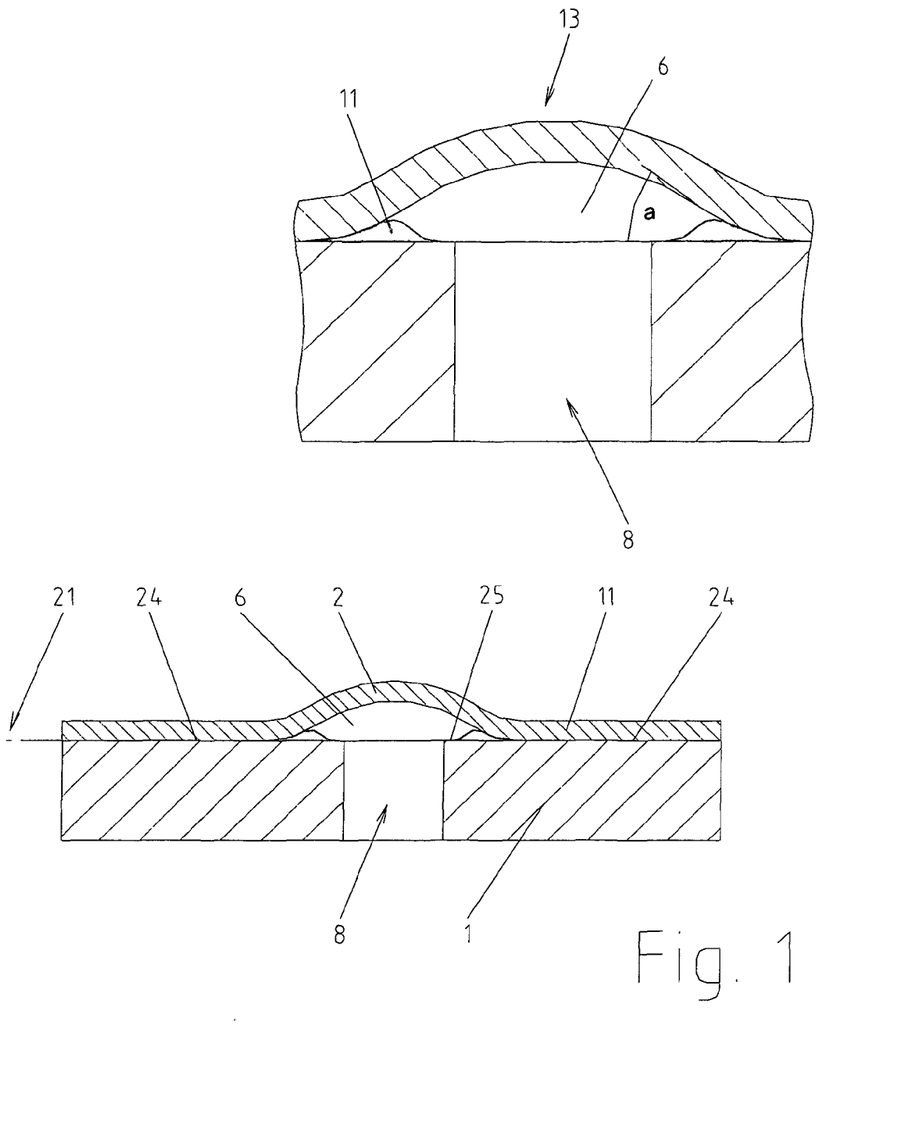
FIG. 1 shows a microfluidic structural element having a chamber above a substrate plane.

In the drawings:

FIG. 1 shows in cross-section a microfluidic structure for the metering or manipulation of a liquid.

The microfluidic structure is formed by a substrate (1) which comprises a breach or opening (8) in the form of a bore.

A film (2) is attached to the substrate carrier (1) at least in parts or in separate areas.

In an unattached portion or unattached area the film bulges above the flat substrate surface so that the unattached film portions form a chamber (6), in particular a channel (5) above the flat substrate plane (21).

The film portions preferably seal the chamber (6) in fluidtight manner from the environment.

As an alternative to the opening (8) shown in the substrate, which is in particular an inlet opening for a microfluidic network, channel sections (5, 20) or chambers (6) and valve spaces may also be delimited in the substrate by the film, as shown in the following description.

Advantageously, the microfluidic chambers (6) and channels (5) may be shaped in the film over an unstructured substrate surface, so as to avoid the need for expensive microstructuring of the substrate carrier (1).

To produce the microfluidic device, the substrate, which consists of a thermoplastic plastics material, is first of all warmed and cast in a mould, or channel structures are introduced by making an impression of the negative structure of the mould in the mouldable plastics. Advantageously, an unstructured substrate sheet with an at least partially planar and/or flat surface may be used for a microfluidic device of this kind. The flat and/or planar surface regions of the substrate sheet may be arranged in steps or terraces relative to one another, so that individual surface regions are at different heights relative to an average surface height.

A film is attached to the surface of the substrate, particularly by lamination.

Figure 11:
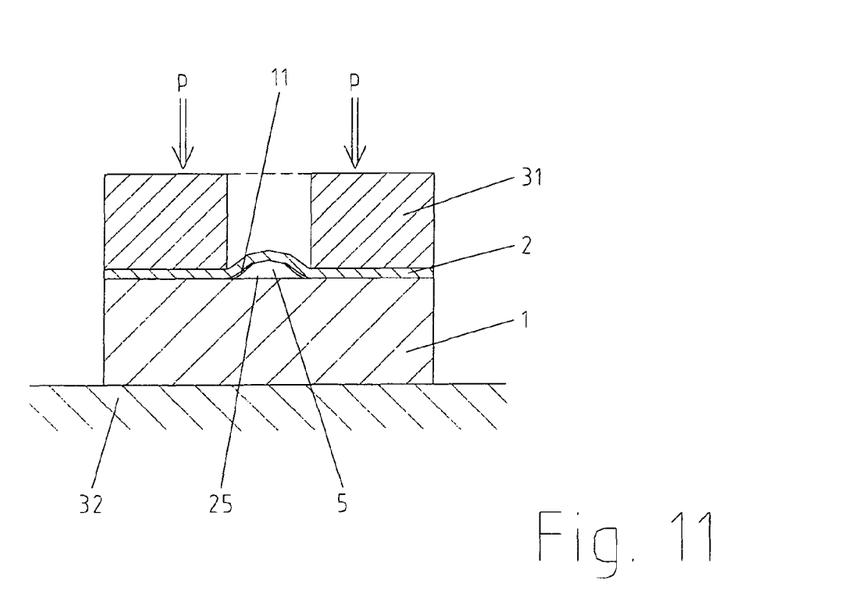
FIG. 11 shows a film channel during production.

FIG. 11 shows a sealing or lamination process in which a planar, unstructured substrate (1) made of plastics is supported on a support sheet (31) which forms the counter-support for the lamination process. A film (2) of thermoplastic plastics material is placed on the substrate and pressed down with a pressure P by means of a heatable pressing die (31).

The substrate material preferably consists of pure polyolefins or blends of polyolefins, particularly polyethylene, polypropylene or mixed blends thereof with copolymers of ethylene or propylene.

For the film material, a thermoplastic elastomer (TPE) based on styrene/ethylene/butylene polymers, EPR (synthetic rubber based on ethylene and polypropylene), EPDM (terpolymer based on ethylenepropylene diene monomers), alloys of polyamide (PA) with polyolefins, blends of PP/EPR/PE, PP/EPDM or PE/EVA/EPDM, EAA or polypropylene copolymers is preferably used.

Alternatively, it is also possible to use PTFE films or PTFE blends or PTFE with fillers such as bronze, glass or carbon as film material, if a poorly wettable plastic is to be used.

The pressing die (31) has an opening, as a result of which no contact pressure P is applied to the film lying on the substrate in the region of the opening.

The pressing die (31) is put into position in the heated state and causes the film material and/or the substrate material to melt, the word "melt" meaning that the material does not become completely liquid but reaches a viscosity that flows under pressure, or is plastically deformable under pressure.

As the lamination, i.e. the flowing together and cross-linking of the materials, is dependent both on the pressure and on the lamination temperatures, these parameters may vary within a wide range.

The geometry of the pressing surface of the pressing die, the sealing pressure, the sealing temperature and the sealing time must therefore be selected so that the desired strength and adhesion of the film (2) to the substrate (1) is achieved.

If the film is to be removable from the mould, the lamination should be adjusted to give adhesion strengths of 2-5 N/10 mm for easily removable bonds or 5-20 N/10 mm for more firmly adhering bonds.

For fixed laminations, adhesive values of 20-80 N/10 mm are used, these adhesive values being based on a tensile test with a testpiece that is 10 mm wide. The contact pressure P used has values of 0.2-20 $N/mm^2$ at sealing temperatures of 70° C. to 170° C. The sealing times envisaged are from 0.2 seconds to 200 seconds.

The substrate material has a higher melting temperature and/or glass transition temperature than the film material. When lamination is carried out in the selected temperature range, this results in greater softening of the film material, thus rendering the film material more capable of flow than the substrate under the laminating conditions.

As the die (31) exerts a pressure P on the film (2) and the substrate (1), the film material in particular flows as a result of the lower shear viscosity.

The pressure and the shear cause film material to be displaced, in particular, into the areas of the die (31) that are free from contact pressure and a wedge of material (11) is thereby formed in the edge region of the opening in the die.

Preferably, no bonding of the film (2) and substrate (1) takes place in the region of the opening in the die (31), thus forming an unattached area (25). As a result of the flow of material, the film bulges in the unattached area and forms fluid-conveying structures between the substrate and film. These may be channels (5) as in FIG. 11, or chambers (6) or microvalves.

The wedge of material (11) formed forces the film upwards in the unattached area and supports the film structure.

Advantageously, film chambers (6) may be arranged over bores (8) or throughflow openings (8) in the substrate (1). As the film is elastic it can easily be deformed, as a result of which the flow in substrate channels (5) or through throughflow openings (8) between the top and bottom of the substrate can be controlled.

As can be seen from FIG. 1, the film chamber (6) can be sealed by the area (24) attached by lamination to make it fluidtight against the environment.

The shape of the film chamber (5) or of the film channel (5) is dependent both on the laminating conditions of the film material, such as pressure, laminating time and temperature, and also on the geometry of the pressing die (31).

Figure 12:
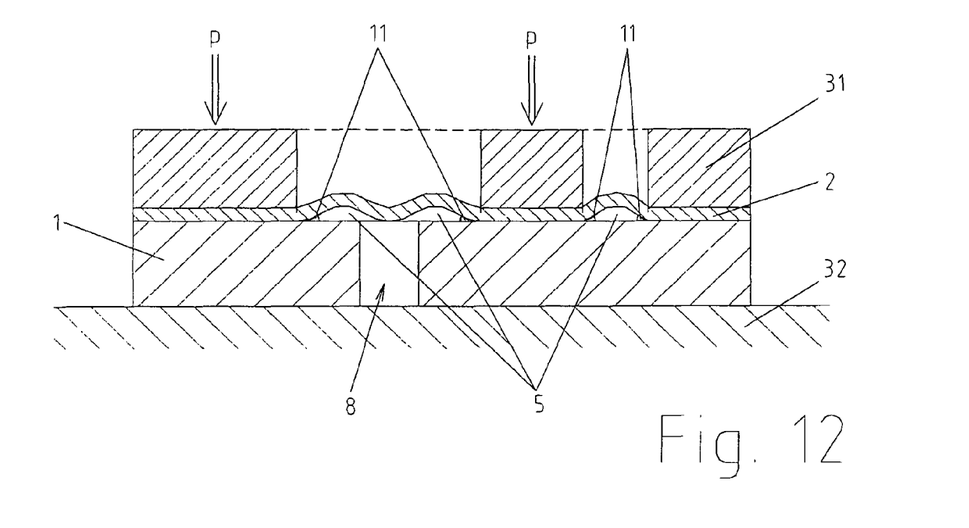
FIG. 12 shows a film channel with a lowered centre.

FIG. 12 shows a laminating process in which a pressing die (31) with openings of different sizes is used. Both in the region of the smaller right-hand opening and in the region of the larger recess situated in the middle of the pressing die (31), the film (2) bulges upwards and wedges of material (11) are formed.

In the central area, the bulging leads to a wave-like cross-section of the film (2) in relation to the substrate (1), thereby forming two channels (5). Advantageously a wave structure of this kind in the region of a throughflow opening (8) can be used as the central zone of the film (2) projects into a throughflow opening (8), as shown in FIG. 12. This ensures that the capillary stop formed by the opening (8) is overcome by wetting the film in the sagging central region.

Figure 13:
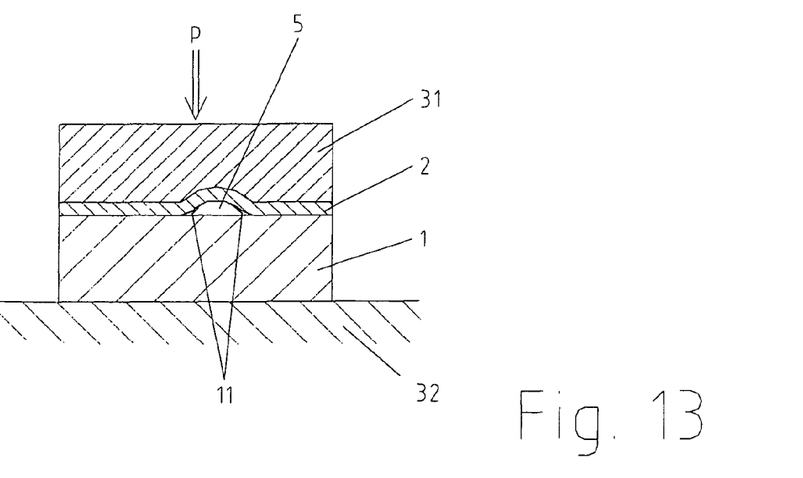
FIG. 13 shows a film channel in a shaping tool.
Figure 14A:
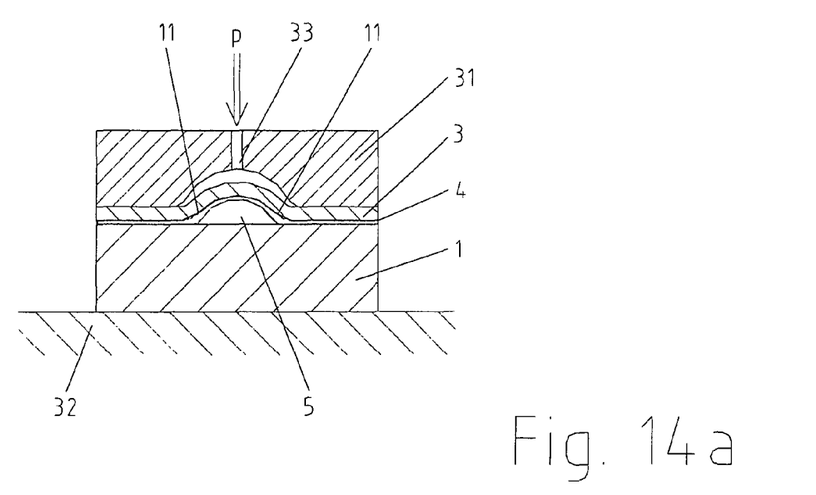
FIG. 14a and FIG. 14b show a film channel with a sealing and pressure film.
Figure 14B:
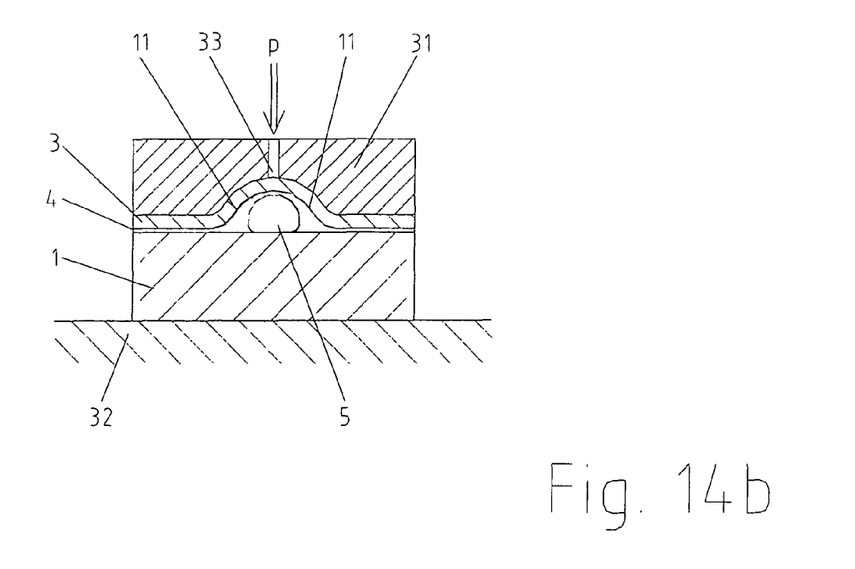

As can be seen from FIGS. 13 and 14, it is advantageously envisaged that the eventual film chamber should be shaped by the pressing die. For this purpose, the pressing die (31) has a semicircular recess on the pressing surface.

During the pressing process the film (2) bulges upwards until it abuts on the surface of the recess and as a result has assumed the semicircular shape as shown in FIG. 13.

Particularly powerful displacement of film material occurs with films having a sealing layer.

Figure 2:
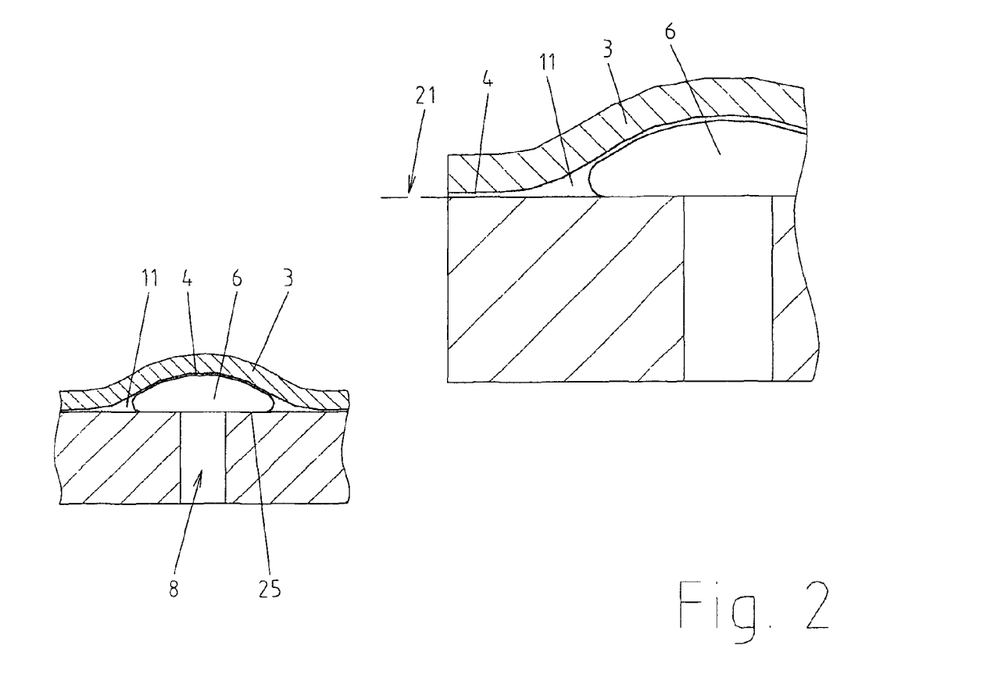
FIG. 2 shows a microfluidic structural element having a two-layered film.

As shown in FIG. 2, a film (2) of this kind consists of a cover film (3) and a sealing film (4). The sealing film is preferably made of EVA and has a lower melting point than the cover film (3) and the substrate (1).

During heating and application of a pressure P, predominantly the material of the sealing film with the lowest shear viscosity at the lamination temperature chosen is displaced into the unattached area (25) and forms wedges (11). The amount of material displaced, the degree of bulge and the size of the wedge of material are dependent on the parameters of laminating time, contact pressure and temperature.

FIGS. 2, 14 *a* and 14 *b* show the laminating process or sealing process for producing a fluid channel after different sealing times while the temperature remains constant.

After a first sealing time t1 the film structure consisting of sealing film (4) and cover film (3) has bulged into the semicircular recess according to FIG. 14*a* and has partially filled it.

Material from the sealing film (4) has heaped up in a wedge shape (11) and lifts the film away from the surface of the substrate. As shown by FIG. 14*b* by comparison with FIG. 14*a*, the thickness of the material of the sealing film (4) decreases as the sealing time increases. After a comparatively longer sealing time t2 the thickness of the sealing film (4) has decreased significantly, the material having flowed into the semicircular cavity in the pressing die (31) which is now completely filled by the cover film (3).

The initially semicircular channel (5), which is bounded at its sides by the sealing material, at least in the side region and base region, is now roughly circular, according to FIG. 14*b*, after the sealing time t2.

As a result of the flow of material of the sealing film (4) the space formed between the cover film (3) and the substrate (1) can be filled completely. Advantageously, fill levels of from 0.1% to 90%, particularly advantageously from 0.1% to 30%, more particularly from 0.1% to 5% of the intermediate space (6) are realised.

The size of the wedge substantially influences the capillary force in the edge region of the channel structure (5).

With an opening angle between the substrate (1) and the wall of the channel (5) of 1° to 10°, with an aperture angle of 5° and an approximately triangular cross-section of opening, a central height or apex height of about 10 microns is obtained in a channel (5) that is 250 µm wide.

In an edge region 10 µm wide, if there were no wedge (11) present, the gap height would be less than 1 µm. An edge gap of this order would have a powerful capillary effect as a result of its low height and would form preshooters, i.e. capillary fronts preceding it.

The existence of the wedge (11) advantageously causes these high-capillary edge regions to be filled deliberately, thus preventing undesirable pre-shooter effects.

Thus, by means of the angle of aperture and the height of the apex (13) as shown in FIG. 1, the capillary properties of the film chambers (6) and film channels (5) during production can be adjusted in targeted manner.

Advantageously the shaping of the film chambers (6) can be influenced both by the geometry of the recesses in the die (31) and by vents in the die (31) in the region of the recesses.

A counter-pressure can be applied to the vents, for example by introducing pneumatic pressure into the manufacturing apparatus from outside. In this way it is possible to control the speed of the bulging process.

Figure 3:
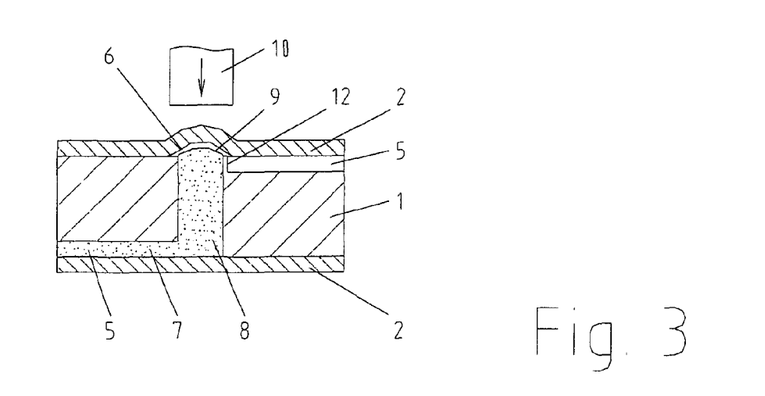
FIG. 3 shows a throughflow opening covered by a film, with a capillary step to a channel.
Figure 4:
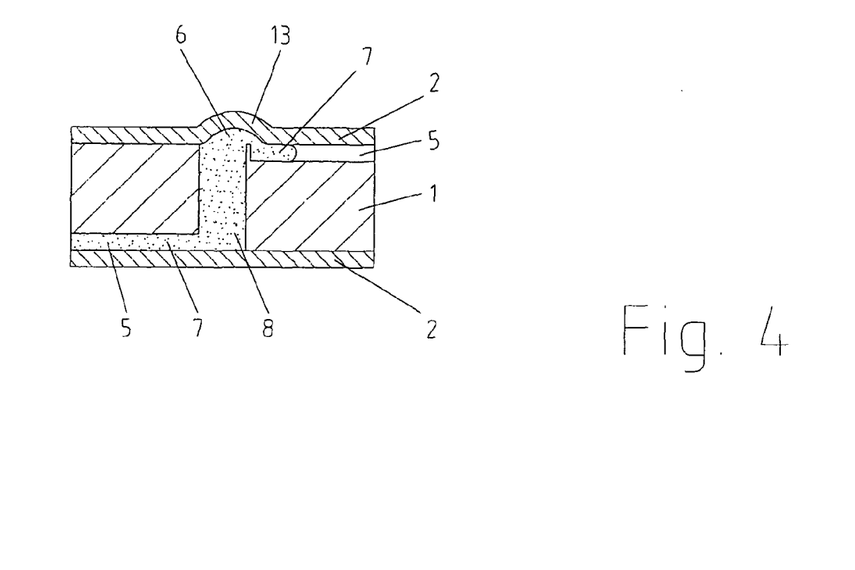
FIG. 4 shows an activated microfluidic valve element according to FIG. 3.

FIGS. 3 and 4 show a microfluidic device that is covered by a film on both the top and bottom of the substrate. Channels (5) are made in the substrate (2) on the top and bottom and are fluidically connected to one another through a transverse bore (8).

At the outlet from the transverse bore (8) on the top, there is an edge or step (12). A liquid passing through the channel on the bottom and rising in the transverse bore (8) forms a meniscus (9) that protrudes into the film chamber (6) at the upper end of the transverse bore.

The film bulging above the interior of the chamber initially has no contact with the meniscus of the liquid. Therefore the edge of the bore (8) acts as a capillary stop for the liquid rising in the bore (8).

It is also possible to produce a capillary stop of this kind without a step (12).

The distance between the film and the wall of the bore must be such that the wetting of the structures stops at the edge, i.e. there is a capillary stop.

When an elastic film is used the capillary stop can be overcome by moving the film. In this way a liquid can be metered in a controlled manner. To overcome the capillary stop, the domed or convex film (2) is pressed down in the region of the throughflow opening (8) by means of an actuator (10) in the form of a punch or piston such that wetting takes place from the meniscus (9) to the film wall. If the actuator (10) is pressed down completely, it can also deliberately terminate a metering process, as the pressed-down film (2) closes off the bore (8) along the top of the substrate and along the step, forming a seal.

If the actuator (9) is moved back, the chamber (6) opens up as a result of the elastic restoring forces of the film material and/or as a result of the fluid pressure of the liquid that is to be metered.

During the metering process the actuated film chamber (6) can perform various functions, namely a valve function by opening and/or closing the chamber (6) by means of the actuator (10) and a throttle function by partial closure. A pumping function can also be obtained by controlled opening and closing.

Instead of an actuator it is also possible to make use of the shape memory properties of certain plastics materials such as polyethylene or polyamide for moving the chamber walls or channel walls.

For this purpose the plastics material is heated to above a specific activation temperature during manufacture, this being done by means of the lamination process. The shape thus obtained, for example one of the shapes mentioned previously, is frozen by rapid cooling. If the material is subsequently heated up again to a point above the activation temperature, it resumes its original shape.

A film wall with a semicircular convexity then loses its dome shape, for example, and as a result of the shaping process closes off a transverse bore (8) as shown in FIG. 3. Displacement of the chamber wall to overcome a capillary stop can also be achieved by the deformation.

Heating may be carried out locally by means of a thermode, a flat heating die or one or more heat radiators. As materials of this kind are also obtainable for activation temperatures in the range below 50° C., particularly from 20° C.-40° C., heat activation by the sample material is also conceivable. For this, the device is cooled to a temperature below the activation temperature, e.g. to 25° C., the activation temperature being 30° C., for example. The sample liquid is introduced at a temperature above the activation temperature, e.g. 35° C., and thereby automatically activates deformation of the film walls, thereby opening and closing microfluidic capillary stops and valves.

As certain plastics react in the same way to UV light, shape memory effects of this kind can also be activated by irradiation with UV light. A local coupling-in of UV light and activation of movements of the films is possible for example by means of a controlled Remote UV laser or by coupling light into the channels using fibre optics.

A possible capillary stop at a transverse bore (8) according to FIG. 4 may also be overcome passively. For this, the chamber apex (13) and the chamber wall are produced and three-dimensionally shaped such that a capillary gap of from 1 micron to 20 microns, particularly from 3 microns to 10 microns, remains above the edge of the transverse bore (8).

The liquid flowing up in the transverse bore (8) forms a meniscus (9) which bridges a capillary gap of this kind and thereby passively closes the capillary stop.

Advantageously, the film chamber (6) is arranged towards the edge of the step so that high capillary forces of the edge regions of the chamber are used to form a capillary bridge. Advantageously, the transitional area may also be given a hydrophilic coating to assist wetting.

The production process according to the invention is particularly suitable for producing fluid channels (5) over the substrate, the width of which is a multiple of the channel height. The channel width is at least 5 times the channel height, particularly 10 to 50 times the channel height.

Figure 5:
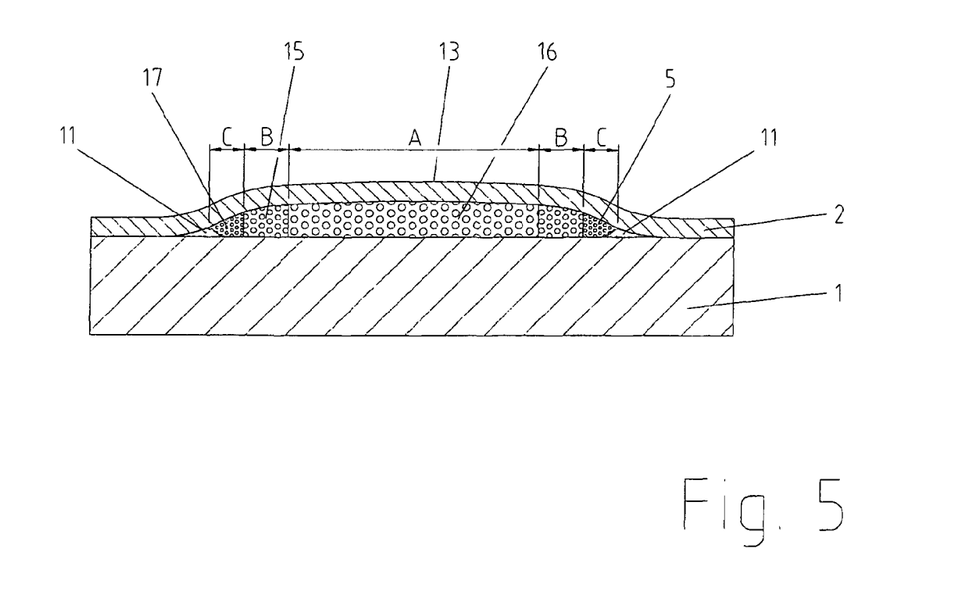
FIG. 5 shows a microfluidic channel for separating the components of a suspension.

A structure of this kind can be seen in FIG. 5. This microfluidic channel (5) has a height of preferably 10 microns in a central region A (13), a height of 5 microns to 10 microns in an adjacent area B and a height of 2 to 5 microns in the edge region C. Because of the limited vertical extent of the film channel (5) the latter may be used to separate blood components. On flowing through the channel, larger blood particles such as erythrocytes preferably arrange themselves in region A, medium particles such as thrombocytes preferably arrange themselves in region B and small blood plasma components preferably arrange themselves in region C. By separating the regions, e.g. by branching or diverting into transverse bores with a corresponding opening in the flow regions, the blood components can be sorted, separated or filtered.

If a defined point on the film (2) is not attached to the substrate and if this region is fluidically connected to a microfluidic system, the construction can be used as a microfluidic valve. For example, by suitably selecting the mechanical properties of the film, certain pressure/volume flow ratios can be set up. Moreover, a fluidic capacity and a reservoir can be introduced into the system in controlled manner.

Figure 6:
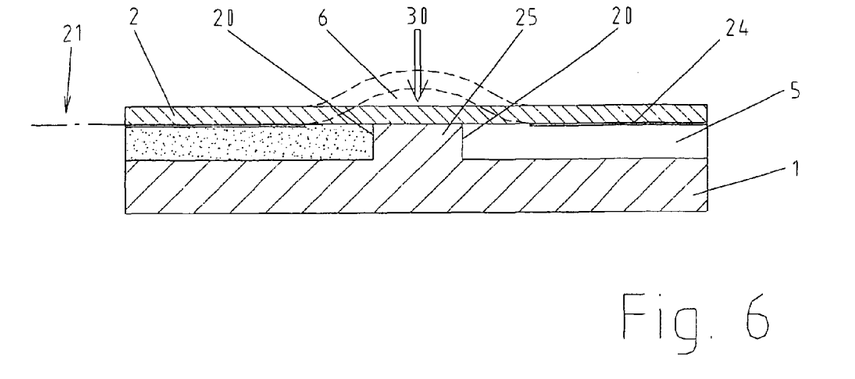
FIG. 6 shows a valve element in which an unsecured film portion covers two channel ends.

In a valve according to FIG. 6, an elastic film (2) is attached to a substrate (1) along the plane of the substrate (21). After attachment, the elastic film (2) rests on the substrate in an unattached region (25). If a liquid is then introduced at a certain pressure, the film (2) is expanded in the region (25), so that two channel ends (20) are fluidically connected in the substrate.

The application of compressed air (30) exerts an additional restoring force on the film. The valve can be opened and closed by means of the compressed air.

Alternatively, in this embodiment, as shown by broken lines in FIG. 6, after production, a convex chamber (6) may also be obtained which fluidically connects the ends of the channels (5) to one another. In this embodiment, too, the chamber can be opened and closed by means of compressed air or a die.

Figure 7:
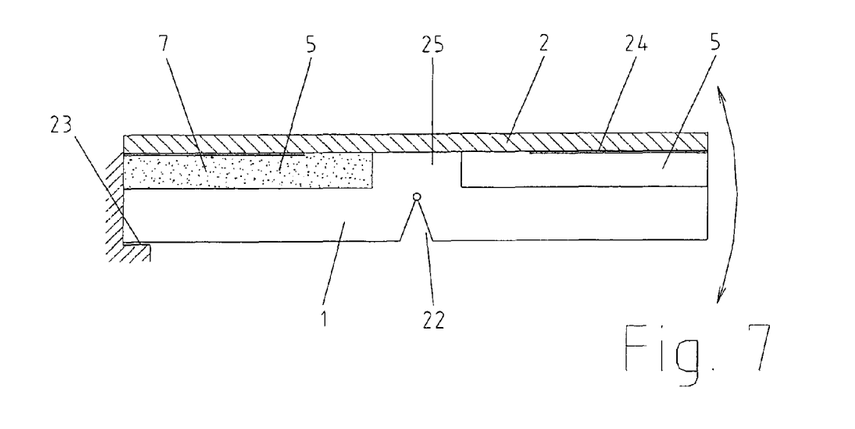
FIG. 7 shows a valve element which is actuated by bending the substrate.

In another embodiment according to FIG. 7, the microfluidic device is clamped at contact points (23) and bent as indicated by the arrow. As a result of the bending of the foil-substrate combination, either, in the event of upward bending, the film (2) is lifted away from the unattached surface (25) and then allows fluid to flow through, and/or in the event of downward bending, is stretched and thereby pressed onto the unattached region (25). In this way a valve, pump or throttle function may be achieved by means of bending. Advantageously, in order to locate and intensify the bend, a recess is provided in the substrate. This is arranged at a point where the maximum bending radii are to be achieved, namely preferably underneath the microfluidic positioning element.

The storage and release of liquids or powders is an important subject in lab-on-a-chip applications. It is often advantageous for the liquid or the powder to be packaged and stored separately from the chip. If necessary, the container can then be applied to the chip.

However, the fluidic coupling of the container to the fluidic system of the chip is generally problematic.

Figure 8:
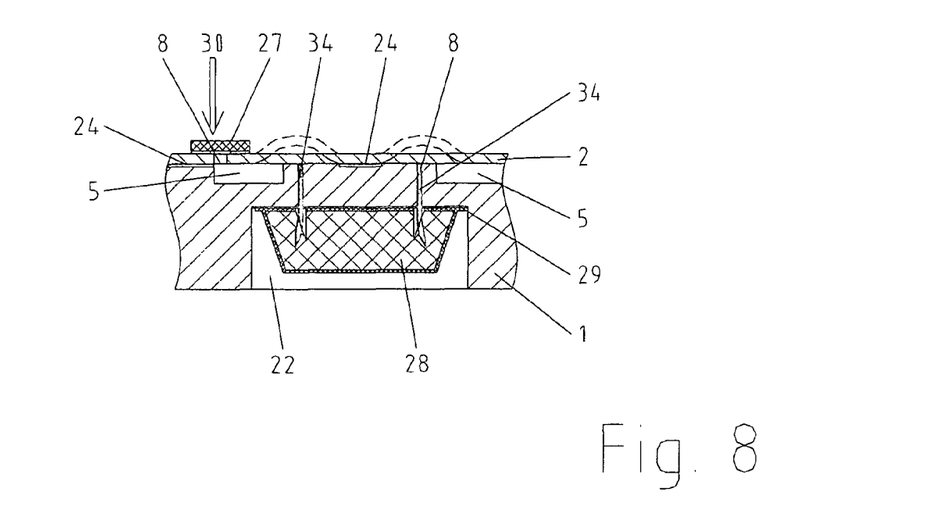
FIG. 8 shows a valve element which is operated pneumatically.

An embodiment for introducing liquids or suspensions into a microfluidic device, the chip, is shown in FIG. 8.

A container or blister (28) is sealed with a diffusion-proof film after the container has been filled with a liquid or suspension. The liquid may be an analyte, in particular. A self-adhesive or self-sealing layer or film is applied to the sealing film of the container (28). The container can be stored in this condition.

In order to use the container, it is placed in a recess (22) in the substrate (1), whereupon the adhesive layer (29) enters into a sealing bond with the substrate. During this attachment or assembling, the container is opened using needles (34) for example. The self-adhesive layer makes contact with the chip and seals it against the openings in the chip and container. On the top of the device, channels (5) are formed in the substrate. The needles (34) are hollow needles that are secured, particularly with adhesive, in bores (8) in the substrate. Alternatively, the needles (34) may be formed by insert moulding or injection moulding during the injection moulding or moulding of the substrate carrier (1).

A channel (5) is fluidically connected to a channel (5) via an opening (8) in the film (2). The opening (8) is covered by a hydrophobic vent, a hydrophobic valve that is permeable to gases and virtually impermeable to aqueous liquids.

The film (2) is attached by its surface to the substrate, with unattached regions located at the needle opening and at the channel ends. The film rests on the unattached regions so as to form a seal. The film is made to bulge upwards by the introduction of compressed air (30), as indicated by broken lines in FIG. 8. The compressed air flows through a first hollow needle (34) into the container and displaces the analyte through a second hollow needle (34) into the channel (5).

Figure 10:
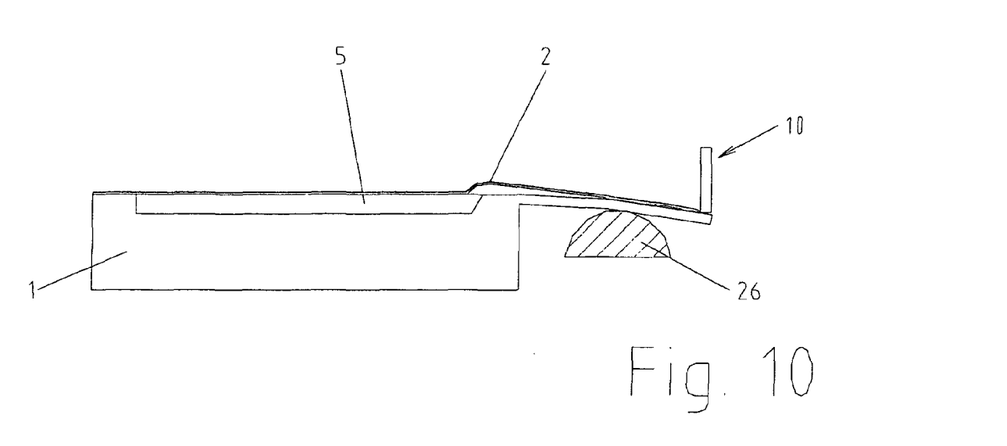

An embodiment in which a volume flow through a channel is constricted in controlled manner is shown in FIG. 10.

Figure 9:
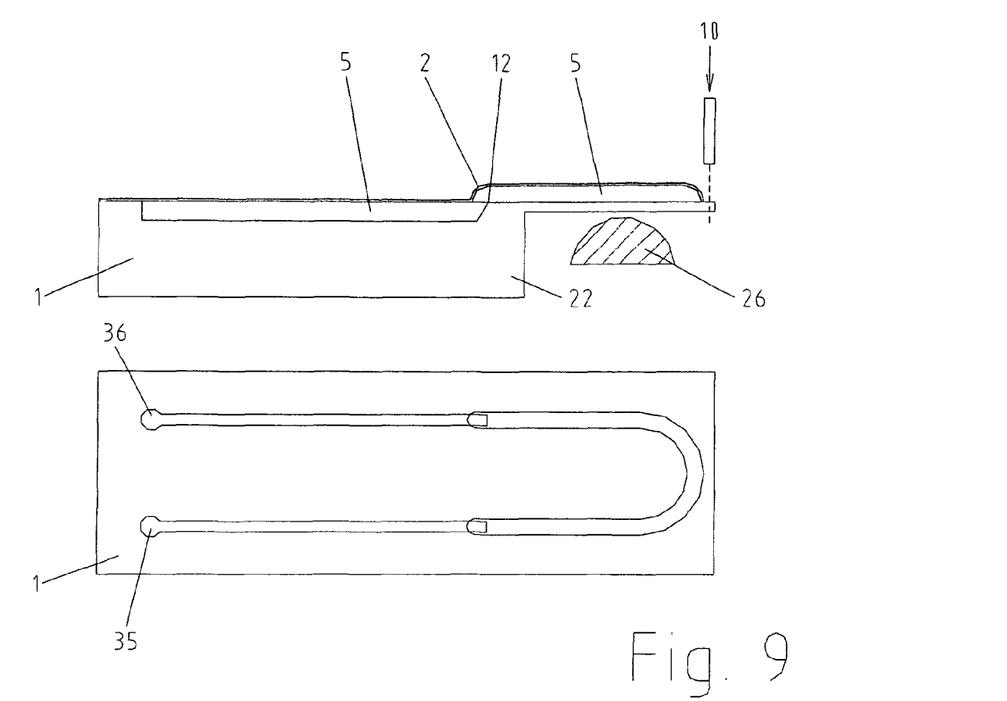
FIG. 9 and FIG. 10 show a channel element on a section of a bending bar which can be mechanically constricted.

A substrate (1) with a graduated thickness has a greater thickness in a first region. In this region there is an inlet (35) and the outlet (36). The inlet (35) and the outlet (36) may be connected to other fluidic structures of a microfluidic network (not shown). Branching off from the inlet (35) and outlet (36) are two channels (5) which extend in the substrate and are covered by a film (2). In an adjacent region the thickness of the substrate is significantly reduced, as shown by the cross-section according to FIG. 9. Film channels (5) fluidically connected to the channels in the first region are formed in the second region, these channels being raised above the plane of the substrate which is flat at that point.

The reduced-thickness substrate (1) rests on a support member (26), particularly an anvil. This substrate region can be bent using an actuator (10) which acts on the end of the substrate. The bending stretches the film channel (5) as shown in FIG. 10, thus constricting the volume flow in the film channel (5).

REFERENCE NUMERALS

1—substrate
2—film
3—cover film
4—sealing film
5—channel
6—chamber
7—liquid
8—bore/throughflow opening
9—meniscus
10—actuator
11—wedge of material
12—step/edge
13—apex
15—thrombocytes
16—erythrocytes
17—blood plasma
20—channel end
21—substrate plane
22—recess/cut-out
23—contact points
24—attached region
25—unattached region
26—support member
27—hydrophobic vent
28—container/blister
29—self-adhesive layer
30—compressed air
31—pressing die
32—support plate
33—vent
34—needle
35—inlet
36—outlet

The invention claimed is:

1. A microfluidic structure, comprising a substrate (1) with channels (5) formed in the substrate (1), and a film (2) attached flat to the substrate (1) with unattached portions (25), so that a chamber (6) comprising a wall is formed above the substrate plane (21) in an unattached portion (25), wherein the film (2) is a multilayer film, in particular a two-layer film, whereby the film (2) comprises a sealing layer (4) arranged on the substrate and a covering layer (3) arranged above it and whereby the sealing layer (4) has a lower melting and/or softening temperature than the covering layer (3) characterized in that at the edge zone between the unattached (25) and attached portions (24) a wedge of material (11) is formed by the viscous flow of the film material as the film (2) is bonded to the substrate (1), this wedge of material (11) forming a transition between the chamber wall and the substrate (1) and lifting the chamber wall away from the substrate plane (21) and whereby the chamber (6) in the film covers one end of a channel section (5) in the substrate (1) and whereby the walls of said channel (5) in the substrate (1) form a step to the chamber (6) in the film.

2. The microfluidic structure according to claim 1, characterised in that the softening temperature of the sealing layer (4) is 60° C. to 200° C., in particular 85° C. to 110° C. and the softening temperature of the covering layer (3) is 150° C. to 350° C., in particular 200° C. to 300° C.

3. The microfluidic structure according to claim 1, characterised in that a microfluidic network is formed by the chamber (6) and/or channels (5) above the substrate plane.

4. The microfluidic structure according to claim 3, characterised in that the chamber (6) covers a throughflow opening (8), in particular a transverse bore (8) through the substrate (1) and the outer edge of the chamber (6) is arranged above the transverse bore (8) such that a capillary gap of 1 micron to 20 μm, in particular from 3-10 microns is produced between the chamber wall and the edge (12) of the step or a channel (5) opens into the transverse bore (8) on the top and bottom and the films (2) are arranged on the top and bottom of the substrate.

5. The microfluidic structure according to claim 1, characterised in that the chamber (6) is disc-shaped in cross-section, particularly in the shape of a spherical segment, the cross-sectional width being at least 20 times the cross-sectional height and the angle formed between the chamber wall in the edge region of the cross-section and the substrate plane (21) being 1° to 20°, in particular 5° to 12°.

6. The microfluidic structure according to claim 5, characterised in that the chamber height is 10 to 15 microns in a first cross-sectional region at the apex (13) of the chamber, 5-10 μm in a second cross-sectional region between the apex (13) and the edge and 0.1 μm to 5 μm in a third edge region, so that as a result of the varying cross-sectional height blood fluid particles of different sizes arrange themselves in different flow regions, whereby predominantly red blood cells flow in the first region, predominantly thrombocytes flow in the second region and predominantly blood plasma flows in the third region.

7. The microfluidic structures according to claim 5, characterised in that the centre (13) of the cupola or dome to the substrate plane (21) is lowered relative to an outer region such that the distance of the substrate plane (21) from the centre of the dome is less than half the maximum vertical distance between the wall of the dome and the substrate plane (21) and whereby a throughflow opening (8), in particular a transverse bore (8) is arranged underneath the chamber dome (13) such that the lowered centre of the dome acts as a capillary initiating point.

8. The microfluidic structure according to claim 4, characterised in that the edge (12) of the step forms a capillary stop, while by actuation of the flexible chamber wall the gap spacing between the chamber wall and the edge of the step can be altered so that the gap is wetted.

9. The microfluidic structure according to claim 5, characterised in that the ends of two channels (5) formed in the substrate are covered by the dome-shaped chamber and that the substrate (1) has a recess (22) in the region underneath the unattached film, particularly on the bottom of the substrate, remote from the film whereby the recess (22) is wedge-shaped or spherical or hemispherical or rectangular.

10. The microfluidic structure according to claim 9, characterised in that the substrate (1) is flexible, in particular can be subjected to a flexural stress, in particular can be bent elastically in a reversible manner in the wedge region and whereby the substrate (1) comprises means for mechanical clamping whereby the clamping means are guides and contact points (23).

11. The microfluidic structure according to claim 1, characterised in that the substrate material is elastic whereby the substrate thickness is reduced along a portion of the extent of a chamber and/or a channel so that this region deforms under reduced bending force, more particularly brings about a change in the cross-section of the fluid chamber or fluid channel in the film and whereby a support member (26), particularly an anvil, is arranged underneath the substrate (1) for supporting the reduced-thickness substrate such that the fluid channel forms a constriction that can be adjusted by bending the structure.

* * * * *

UNITED STATES PATENT AND TRADEMARK OFFICE
CERTIFICATE OF CORRECTION

PATENT NO. : 8,580,209 B2
APPLICATION NO. : 12/995550
DATED : November 12, 2013
INVENTOR(S) : Kurowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 66 days.

Signed and Sealed this

Twenty-second Day of September, 2015

Michelle K. Lee
*Director of the United States Patent and Trademark Office*